United States Patent [19]
Eirich et al.

[11] 3,760,051
[45] Sept. 18, 1973

[54] METHOD OF FORMING GRANULES

[76] Inventors: Wilhelm Adolf Eirich, Bahnhofstr. 19; Gustav Josef Eirich, Walldurner Str. 41, both of Hardheim, Germany

[22] Filed: Mar. 22, 1971

[21] Appl. No.: 126,699

[30] Foreign Application Priority Data
Apr. 1, 1970 Switzerland.......................... 4871/70

[52] U.S. Cl. ................................................ 264/117
[51] Int. Cl. ................................................. B01j 2/12
[58] Field of Search ..................................... 264/117

[56] References Cited
UNITED STATES PATENTS
3,228,891 1/1966 Duke ................................ 264/117
3,471,407 10/1969 Spring ............................... 264/117

OTHER PUBLICATIONS
Kirk–Othmer, Encyclopedia of Chemical Technology, Vol. 10, pages 550, 551, John Wiley & Sons, 1966.

Primary Examiner—Robert F. White
Assistant Examiner—J. R. Hall
Attorney—Toren and McGeady

[57] ABSTRACT
Method of forming granules from meltable mixtures containing sand, aqueous sodium hydroxide and quicklime. The components are fed to a granulating mixer and are mixed in the presence of heat until compact granules have been obtained. The mixture to be fed to the granulating mixer may also contain soda ash and limestone.

6 Claims, 1 Drawing Figure

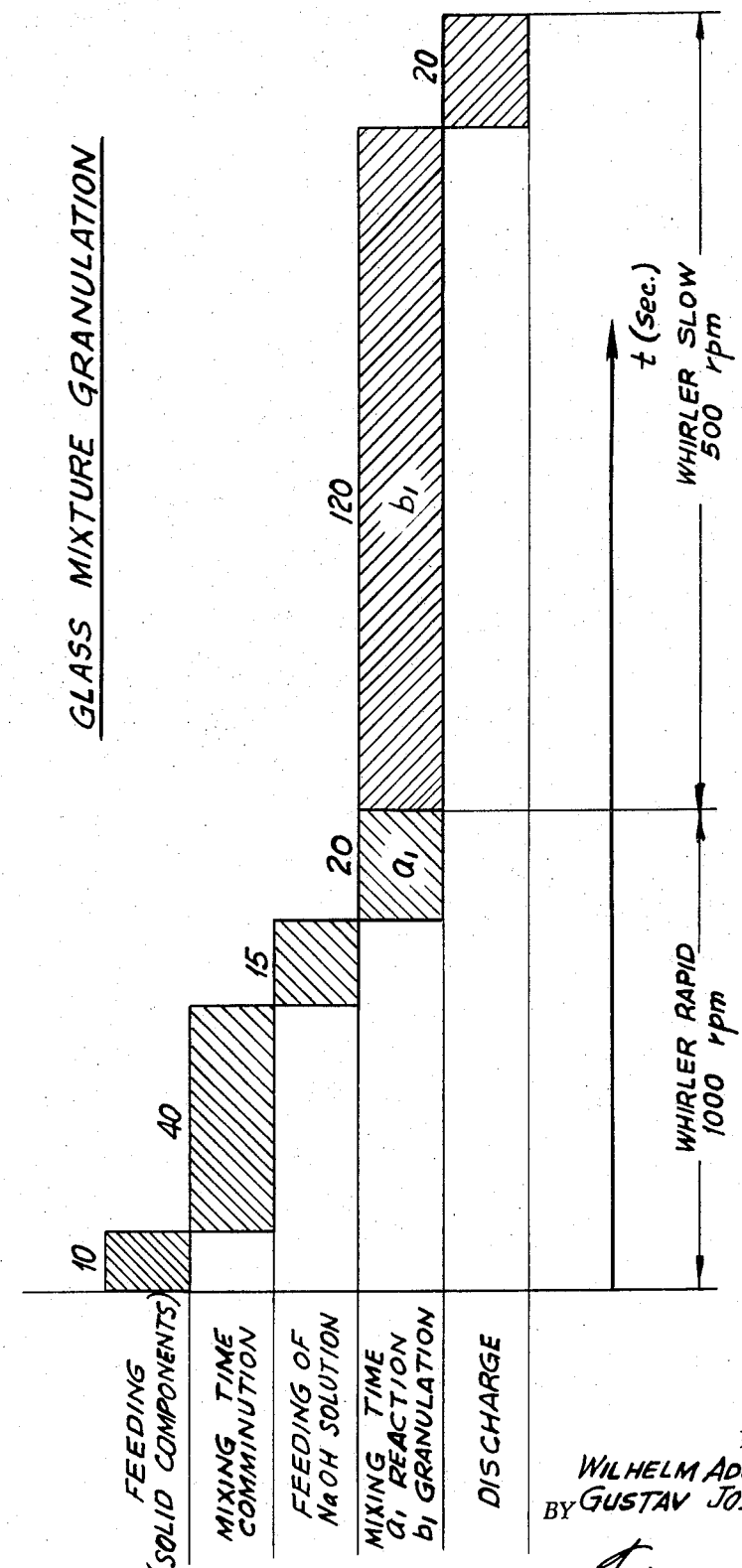

METHOD OF FORMING GRANULES

FIELD OF INVENTION

The invention is directed to a method for the industrial processing of meltable mixtures containing sand and lime, for example glass producing mixtures, wherein at least a portion of the soda ash is replaced by sodium hydroxide solution of about 50 percent concentration, in the presence of heat. The inventive method is particularly concerned with the production of granules of meltable mixtures of the indicated kind which can be melted in economic manner and are useful for the production of glass, enamel and ceramic materials. The term "processing" as used herein refers to the mixing and granulation of such mixtures. Although the inventive method is suitable for producing granules from a variety of meltable mixtures of the indicated kind, it is particularly applicable to the production of granules to be processed into glass, and accordingly the invention in the following is primarily described in connection with the production of glass.

BACKGROUND INFORMATION AND PRIOR ART

According to a prior art method, glass mixtures or batches are customarily produced by mixing sand with sodium carbonate (soda ash), limestone and, in some instances, other solid components. The mixture is then moistened to a water content of about 2 – 5 percent and is well mixed. The purpose of the moistening is essentially to prevent flow of fine solid components through the coarser ones so as to avoid separation of the mixture and to prevent dust formation during shipping of the mixture from the mixing plant to the melting tank or pot. The finished mixture is then transferred into a melting furnace. The mixture is melted in the melting furnace by flames which are directed towards the mixture from the top or by other heating means as, for example, electrical heating or combined flame- and electric heating. In these prior art methods, it is not possible to avoid the separation or unmixing of the individual components of the mixture in a fully satisfactory manner. When the mixture is fed into the tank pot, the moisture immediately evaporates due to the high tank or pot temperature which normally is about 1,400° to 1,600°C. Although the individual particles of the mixture have somewhat agglomerated or baked together by the preceding moistening, in practice, it cannot be avoided that many fine particles are carried along by the heating gases. This phenomenon is normally referred to as dusting in the tank. The velocity of the heating gas must therefore be correspondingly reduced which, in turn, negatively affects the melting capacity or output of the tank. For example, if the fine soda ash particles deposit at the refractory walls with which the interior furnace walls are lined, the lining usually being made from fire brick or chamot, the life of the furnace lining is considerably reduced since the fire brick or chamot is partially destroyed by the soda ash. This moreover causes contamination of the glass melt. The fine-grained mixture has a relatively low specific density which, in turn, causes a relatively high air content in the mixture. The consequence of this is low heat conductivity.

The glass industry, for many decades, has endeavored to improve the mixing and granulation of the glass producing mixtures by feeding into the tank a mixture or mass consisting of relatively coarse granules. A separation of the individual components of the mixture during shipping and insertion into the tanks or pots is not possible if the mixture is present in the form of solid pellets and briquettes. This is so because a mixture of large grain or particle size is not whirled up by the heating gases in the furnace. Dusting and the disadvantages connected therewith are thus effectively prevented in this manner. The individual components of the mixture form compact structures or matrixes in such pellets or briquettes which, in comparison to customary fine-grained mixtures, have a substantially lesser pore content. This means that in such pellets or briquettes a much higher heat conductivity than in a loose mixture is obtained.

It is well known that a precondition for successful granulation of pourable material is that the pourable material must contain a relatively high moiety or content of fines or must have a correspondingly large specific surface. Most of the usual glass-producing mixtures do not possess a sufficiently high content of finely divided material or fines so as to render it possible to granulate the mixture without previous modification.

Various procedures have been proposed for the purpose of increasing the fine content of the mixtures by at least partially grinding the sand or by replacing limestone flour by calcium hydroxide. The grinding of the extremely hard quartz, however, is exceedingly costly and moreover has the disadvantage that a considerable amount of iron is abraded from the grinding machine and is thus introduced into the mixture. A high iron content is, however, undesired in glass-producing mixtures since it results in discoloration of the glass.

SUMMARY OF THE INVENTION

It is a primary object of the invention to provide a procedure for mixing and granulating meltable mixtures, such as for example, glass-producing mixtures in such a manner so as to produce granules which can be successfully further processed.

It is also an object of the present invention to overcome the drawbacks of prior art meltable mixtures of the indicated kind.

A still further object of the invention is to provide a procedure for producing granules from meltable mixtures which does not require a preceding or separate comminution or grinding of solid components, such as sand, of the mixture.

A still further object of the invention is to provide a procedure of the indicated kind which renders additional drying procedures unnecessary.

Another object of the invention is to provide a mixing and granulating procedure for meltable glass-producing mixtures which results in granules which can be successfully further processed without requiring preceding grinding of the sand and additional drying procedures.

It is also an object of the invention generally to improve on the art of mixing and granulating glass-producing mixtures as presently practiced.

Aqueous sodium hydroxide (caustic soda) is in increasing measure obtained as a by-product of various chemical processes. Accordingly it is desirable to find useful applications for caustic soda in other industrial processes. It has previously been proposed partially to replace the flux component in glass-producing mixtures, which customarily is in the form of soda ash, by caustic soda, to wit, aqueous sodium hydroxide solution of 50 percent concentration as it is commonly available on the market. According to these known procedures, the sand is mixed with limestone and sometimes other solid components as well as with caustic soda solution of 50 percent concentration. For melting technical reasons, the moisture content of the glass producing mixture is limited to at the most 5 percent. This, in turn, limits the amount of aqueous sodium hydroxide solution which can be added to the mixture. However, an at least partial replacement of the flux by sodium hydroxide solution is desired because the presence of caustic soda in the mixture reduces the eutectic point of the meltable mixture, and a lower melting temperature can be obtained thereby.

The use of sodium hydroxide solution as a flux component instead of the customarily used water for wetting the mixture has the additional advantage that upon drying during the procedure, the crystallizing lye or liquor, due to its relatively high solid content, forms a much smaller pore space than water. As is known, water, in the course of the drying procedure leaves in the mixture or the granules formed from the mixture, relatively large pores. Furthermore, the use of sand of a high content of fines or prior grinding of the sand are rendered unnecessary if caustic soda forms part of the flux.

For the formation of granules according to known procedures, a moisture content of the material to be granulated of about 12 – 18 percent has been deemed necessary. Thus, a procedure has been suggested in which a component mixture whose components previously had been mechanically comminuted, is granulated under an admixture of caustic soda of 12 – 18 percent. The granules produced in this manner have, however, the drawback of containing relatively large amounts of iron — due to abrading during the comminution procedure — and, moreover, they must subsequently be dried to a residual moisture content of at the most 5 percent.

In accordance with the invention, these disadvantages of the known granulation procedure are prevented by employing a calcium component which at least partially consist of quicklime and by introducing the calcium component with soda ash and/or sodium hydroxide solution as well as other solid components if necessary and sand into a mixing zone of a granulating mixer in which the mixture with the supply of heat is mixed until compact granules are formed. In accordance with the inventive procedure, a higher percentage of caustic soda solution than hitherto can advantageously be added to the mixture in the usual technical concentration. The water content of the sodium hydroxide solution is then utilized for the heat evolvement by employing quicklime as at least a partial constituent of the calcium component in the mixture, whereby the water of the caustic soda solution causes exothermic slaking of the quicklime. During the slaking procedure the lime binds chemically with about 30 percent of the water calculated on its own weight while an additional part of the excess water evaporates due to the reaction heat. For further evaporation and for obtaining a suitable temperature for the granulation, the sand component of the mixture, prior to being added to the mixture, may be heated, for example, by means of furnace-off-gases in a heating drum, to such a temperature that the sand heats the mixture to about 70°C.

Compared to conventional procedures, the caustic soda content may thus be increased by such an amount that its water content is chemically bound by the lime and vaporizes by the reaction heat. If the caustic soda moiety of the mixture does not exceed that of prior art procedures, drying is generally not required. The slaked lime or calcium hydroxide formed in accordance with the invention, has a much greater fineness than ordinary limestone flour. While the specific surface of the limestone flour is about $0.2 - 0.5$ m$^2$/g, the specific surface of dry slaked calcium hydroxide is $5 - 15$ m$^2$/g. This value, as will be described herein below, can be still further increased by activation during the slaking procedure. In this manner and without any mechanical comminution resulting in undesired abrasion and requiring considerable energy consumption, the required amount of fines necessary for the granulation of the mixture is superiorly obtained.

A meltable mass, in accordance with the invention, is easily granulated. In order to achieve the reaction between the caustic soda solution and the quicklime within a time period which is considered economical from a glass-producing point of view, it is necessary to increase the reaction speed by supplying heat to the reaction. The heat may be supplied in different ways. For example, the sodium hydroxide solution may be separately heated before being admixed with the other components, or the solid components of the mixture may be separately heated prior to admixture. Thus, for example, the sand may be separately heated and then added to the mixture. Since sand is the largest component of the mixture and can be heated in relatively simple manner since sand upon heating does not dust and can be brought into direct contact with heating gases, the prior separate heating of the sand is particularly advantageous.

The melting point of aqueous sodium hydroxide solution increases with increasing concentration. Since during the inventive procedure water is removed from the sodium hydroxide solution, the concentration of the solution gradually increases which, in turn, causes an increase of the melting point. The increase of the melting point of the caustic soda solution has the advantage that due to crystallization of the caustic soda, the final granules have a greater stability. The plasticity of the caustic soda which increases, due to the increased melting point, is also of advantage for this purpose. The slaking heat on the other hand makes sure that the plasticity of the mixture does not exceed that limit value which would prevent proper granule formation.

The excess of water which is contained in sodium hydroxide solution of 50 percent concentration, may be removed in advantageous manner in two stages. After the first stage, which terminates with the granule formation, the amount of water which is still present in the mixture, must still be sufficient to enable the formation of granules. If the water removal in the first stage would be too extensive, no granules but a loose mixture would be formed which would not be capable of forming granules but at best briquettes. Once the granules have been formed by proper adjustment of the moisture content of the mixture, the granules possess already a relatively high stability The removal of the residual moisture may then be accomplished in a second stage in customary drying plants, under certain circumstances by using the furnace-off-gases.

It is particularly preferred to incorporate the temperature adjustment of the mixture, to wit, the heat supply, into the total process starting from the mixture of the raw material components and terminating with the glass melt, in such a manner that a substantially constant temperature increase occurs and that strong cooling during the granule production is prevented. Starting with the previously heated and, for example, dried sand, the temperature of the freshly produced granules is to be increased further in the drying plant. The drying plant, from a practical point of view is advantageously part of the mixing and granulating machine. A further temperature increase is then accomplished in the subsequent melting procedure. Between melting process and granulating mixer or a briquette press and dependent on the particular process to be employed, a presintering plant may be interposed. A successive temperature increase is assured according to the procedure described above.

The choice of proper and suitable machines for carrying out the inventive procedure should not be neglected. It is particularly advantageous if, in accordance with the invention, a counter-flow granulating mixer is used which, by incorporation of a whirler operates as an intensive action mixer. In this manner, the mixing time is further reduced in an advantageous manner, and the mixing is considerably intensified. A rapidly rotating intensive action mixer is a machine which is known as a counter-flow-compulsory type or forced-flow mixer, however, with the difference that the specific energy output (kW/100 kg material to be mixed) is increased through the mixing tools by the additional employment of rapidly rotating tools, for example so-called whirling action tools. Essentially three different kinds of mixers should be distinguished according to the available mixing energy.

1. Free-fall mixers with a specific mixing energy of 0.5 – 1 kW/100 kg
2. Compulsory type or forced-flow mixers with 1.0 – 5 kW/100 kg, and
3. Intensive action mixers with 5.0 – 15.0 kW/100 kg and more.

Meltable mixtures in powder form have ordinarily a relatively low mixing resistance. Due to the addition of caustic soda and due to the chemical reaction which proceeds during the mixing procedure, the consistency of the mixed material becomes more plastic, and the specific energy requirement increases. For this reason, machines with increased specific mixing energy, to wit, intensive action mixers, are particularly suitable for the inventive procedure. The use of intensive action mixers with rapidly rotating mixing tools has the following additional advantages:

Many of the individual components of glass-producing mixtures have, as is known, the tendency to form agglomerates during storage in bags or silos. To obtain a desired homogenous mixture, it is thus required to break up these agglomerates.

The higher speeds of the rapidly rotating tools cause a more rapid mixing of the individual components and result in a more rapid reaction between the sodium hydroxide solution and the quicklime. Due to this more rapid reaction course, the heat evolution, which is required for the procedure, is still further increased.

In accordance with the invention, it is particularly advantageous if the mixture, during and after feeding to the mixing zone, is mixed with a first high rotary speed while during and after addition of the aqueous sodium hydroxide solution the mixing is accomplished with a second lower speed of the whirling producing tools. The mentioned first high speed corresponds advantageously to about 1,000 rpm, while the second lower speed corresponds advantageously to a value of about 500 rpm. Expressed in terms of circumferential speed, values of from 10 to 25 m/sec are preferred. The specific values, however, are dependent on the size of the respective machines which are used for the mixing. The manner of the mixing course and the sequence in which the individual components are added to the mixture will in each individual case be determined by the particular method which has been chosen for the heat supply and by the reaction conduct of the lime.

The whirling-action-producing tools, which are present in the intensive action mixer, strongly mix the solid components during and after feeding to the mixer so that the flux component, which is then added to the mixture, is readily taken up by a well distributed mass. In the event that it should be necessary to subject the granulated mixture to a subsequent drying, drying apparatus of the most varying kind can be used for this purpose. In many instances, substantial drying can be effected in the mixer proper if warm air is introduced into the still hot mass. But drying in a separate vessel or apparatus is of course also feasible. In most instances, however, such a drying is not necessary. The main advantage of the inventive procedure resides in the fact that the mixing and granulating procedure may be carried out within a short period in the same machine and without additional mechanical comminution of one or several of the solid components and without requiring high energy supply for drying purposes.

The granules which are produced in accordance with this invention can be stored without decomposition for long periods of time and can be readily shipped. No dusting takes place if in the subsequent melting furnace the flames are directed on the upper side of the mass composed of the granules so that the disadvantages resulting therefrom, as previously described, are successfully avoided. Due to the relatively small interspaces between the granules, the flames are able to penetrate into the granule layer. The heating of the mass to be melted occurs very rapidly. Larger amounts of carbon dioxide are not formed. This is of advantage since carbon dioxide has a tendency to form heat insulating bubbles in the melt. In accordance with the invention and due to the chemical composition and the occurring reaction, a rapid melting of the granules is facilitated.

As previously indicated, it is within the scope of this invention to replace but a portion of the soda ash by sodium hydroxide solution while only a portion of the calcium component may be made up by quicklime. It is also within the scope of this invention to dimension the heat content of the solid components which make up the mixture in such a manner that the moisture content of the mixture is tuned to the requirements of the further processing.

Experience has indicated that the fineness of the slaked lime can be considerably increased if an intense mechanical processing of the material in the process of being slaked is performed during the slaking procedure.

It is known that the fineness of calcium hydrate or the specific surface thereof can be increased by additional mechanical action during the slaking procedure from a value of 5 – 15 m²/g to a value of 30 – 45 m²/g. The production of very fine material which is extremely important for successful granule formation is thus considerably facilitated by the use of an intensive action mixer.

The following tests were performed with relatively small amounts of raw material in an intensive action mixer, to wit, a compulsory type or forced-flow counter-flow mixer with rotating mixing pan. In the mixer used for the following experiments, a tool system having two rakes and a mixing paddle as well as a high speed whirling producing device contrarotated relative to an excentric axis. The speed of the pan amounted to 15 – 20 rpm which corresponds to a circumferential speed of 0.6 – 0.8 m/sec. The speed of the mixing tool system amounted to 80 – 100 rpm corresponding to a circumferential speed of 1.4 – 2.0 m/sec. The whirling producing device operated with two different speeds as illustrated in the accompanying drawing which is a diagram in which the granulating course is illustrated as a function of time in diagrammatic manner.

Referring now to the drawing, it will be noted that two speed ranges for the whirling producing device are depicted on the time axis. In the first range, which covers the time period from the start of the test up to 85 seconds, the whirling producing device rotates at high speed, for example, 1,000 rpm corresponding to a circumferential speed of 20 m/sec. In the second range, the whirling producing device rotates with a lower speed of, for example, 500 rpm corresponding to a circumferential speed of 10 m/sec.

The graph indicates that during the feeding of the mixer with the solid components, the mixer starts operating at the higher speed. After 10 seconds the mixing time for the comminution of the individual component parts sets in which lasts about 40 seconds. These 40 seconds, however, can be eliminated with mixtures in which comminution is not required. Thereafter, and for 15 seconds follows the feeding of the aqueous sodium hydroxide solution of 50 percent concentration. The mixture thus obtained is then mixed for 20 seconds. An automatic control device switches now the speed of the whirling producing device to the lower value, to wit, the second speed. The individual time periods are different for different mixtures dependent on their composition. The specific values can be determined by comparison tests. As a rule, the higher whirling speed will be maintained until the formation of granules sets in.

The following tests were performed with small amounts.

TEST 1

Twenty-four parts of sand were heated to a temperature of 80°C. 4.48 parts of quicklime of a temperature of 80°C were added thereto. The mixture did not contain any calcium carbonate, to wit, limestone. After addition of 12 parts of aqueous sodium hydroxide solution of 50 percent concentration at a temperature of 75°C, dry granules were obtained.

TEST 2

In this test the same amounts of sand and quicklime were again mixed at a temperature of 80°C with 12 parts of caustic soda of 50 percent concentration. In this test, however, the admixture of the caustic soda solution was effected at a temperature of 85°C. After mixing of 2 minutes, the moisture amounted to 10.4 percent, while after mixing of 4 minutes, the moisture content had been reduced to 10.1 percent. Satisfactory granules were obtained after 5 minutes.

TEST 3

In this test, the following components were mixed: 12 parts of sand at a temperature of 150°C, 2.24 parts of quicklime at a temperature of 20°C, 6 parts of caustic soda solution of 50 percent concentration at a temperature of 128°C. The mixture was mixed for 6 minutes. It was found that the sand temperature was too high so that the moisture or the water content in the mixture dropped to values which were too low. For this reason, and in order to obtain a satisfactory grain size, 500 cm³ of water were added at a temperature of about 30°C. The temperature after a mixing period of 6 minutes amounted to 105°C. The water content then was 5 – 6 percent, dependent on the grain size. This and similar tests indicate that the original maximum grain size of 1 mm increased due to the granulation to approximately 10 mm.

TEST 4

This test serves the purpose to demonstrate that satisfactory granulation is achieved by the inventive procedure even if the soda ash is only partially replaced by caustic soda solution and correspondingly the customarily used limestone flour is only partially replaced by quicklime. The following test was thus performed:

Twelve kg of sand, 3 kg of limestone flour, 1 kg of quicklime, 3.5 kg of soda ash and 1.0 kg of 50 percent caustic soda solution were fed into a mixer which was heated to a temperature of about 50°C. The mixer was heated with steam to about 62°C. The mixture was at the same time moistened with 1.1 kg of water, to wit, about 5 percent of the total mass. The mass, which was removed from the mixer, was then pressed into briquettes on a customary press. The moisture of the mixture was ascertained to have a value of 7.9 percent. The briquettes or compressed bodies thus obtained solidified during cooling and had a density of about 1.70 – 1.75 kg/l.

Dependent on the desired mixture, corresponding other tests may be performed with a view to ascertaining the mixing period after which a satisfactory granulation can be expected. This, together with the inventive procedure can be utilized for the purpose of rendering the plant automatic.

For example, the speed with which the intensive action mixer operates during and after feeding of the solid components, may be pre-programmed. The same applies to the time period during which the intensive action mixer has to operate. In accordance with the set program, the intensive action mixer is then switched to a second lower speed for its whirling producing device after flux has been added. The plant will automatically switch off after the mixing time has expired, whereupon satisfactory granules corresponding to a previous test experiment may be expected.

The above measures are particularly advantageous if the soda in the meltable mixture is partially replaced by caustic soda solution of customary concentration, and the calcium component, at least partially, consists of quicklime. The pre-heating of the sand and the heating of the mixture by the pre-heated sand is, however, very advantageous in other instances as well so as to raise the temperature of the total mixture to a working temperature of about 70°C. The heating, if desired, could also be accomplished by the introduction of steam. However, heating of the sand, for example with the off-gases from the furnace is preferred in order to obtain a moisture content in the final mixture of about 5 percent.

What is claimed is:

1. A method of forming granules from a glass-producing mixture comprising:
   a. preparing a mixture consisting essentially of
      1. heated sand;
      2. aqueous sodium hydroxide solution of about 50 percent concentration and in an amount sufficient to provide a quantity of water to enable the formation of granules by agglomeration; and
      3. quicklime;
   b. feeding said mixture into the mixing zone of a rotating mixing granulator and rotating the mixture in said mixing zone to form granules, whereby the water in said aqueous sodium hydroxide solution reacts with said quicklime in the forming of said granules in said mixing granulator.

2. A method as claimed in claim 1, wherein the water content of the mixture of (a) is between about 5 – 8 percent.

3. A method of forming granules from a glass-producing mixture comprising:
   a. preparing a mixture consisting essentially of
      1. heated sand;
      2. aqueous sodium hydroxide solution of about 50 percent concentration and in an amount sufficient to provide a quantity of water to enable the formation of granules by agglomeration; and
      3. quicklime and limestone;
   b. feeding said mixture into the mixing zone of a rotating mixing granulator and rotating the mixture in said mixing zone to form granules, whereby the water in said aqueous sodium hydroxide solution reacts with said quicklime in the forming of said granules in said mixing granulator.

4. A method of forming granules from a glass-producing mixture comprising:
   a. feeding a mixture of heated sand and quicklime into the mixing zone of a rotating mixing granulator and rotating said mixture in said mixing zone at a first rotational speed;
   b. adding aqueous sodium hydroxide solution of about 50 percent concentration to the mixing zone, said aqueous sodium hydroxide solution being added in an amount sufficient to provide a quantity of water to enable the formation of granules by agglomeration; and
   c. rotating the resulting mixture in said mixing zone at a second rotational speed to form granules, said first rotational speed being greater than said second rotational speed, whereby the water in said aqueous sodium hydroxide solution reacts with said quicklime in the forming of said granules in said mixing zone.

5. The method of claim 4, wherein the mixture of (a) also contains an amount of limestone as calcium-containing component.

6. A method of forming granules from a glass-producing mixture comprising:
   a. preparing a mixture consisting essentially of
      1. sand;
      2. aqueous sodium hydroxide solution of about 50 percent concentration and in an amount sufficient to provide a quantity of water to enable the formation of granules by agglomeration; and
      3. quicklime;
   b. feeding said mixture into the mixing zone of a rotating mixing granulator and rotating the mixture in said mixing zone in the presence of heat to form granules, whereby the water in said aqueous sodium hydroxide solution reacts with said quicklime in the forming of said granules in said mixing granulator.

* * * * *